Oct. 21, 1958 H. CONN ET AL 2,857,166
QUICK CHANGE TOOL HOLDER
Filed Nov. 8, 1956
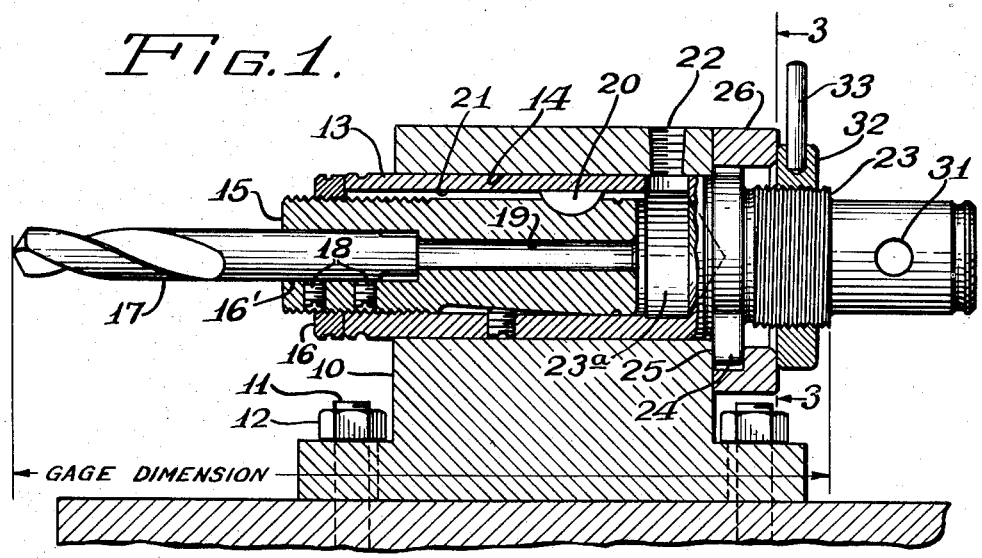
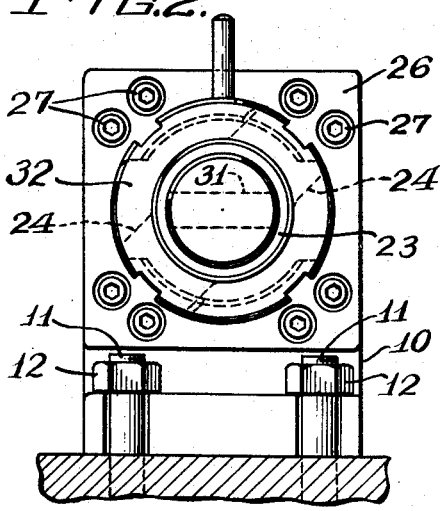
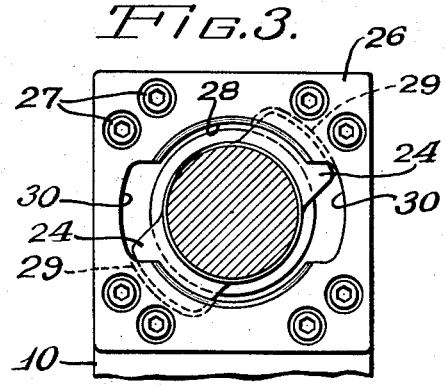
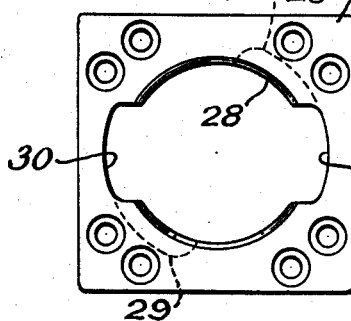
Inventors:
Harry Conn
Aldo David Tognetti
By Glenn S. Noble Atty.

United States Patent Office 2,857,166
Patented Oct. 21, 1958

2,857,166
QUICK CHANGE TOOL HOLDER

Harry Conn and Aldo David Tognetti, Chicago, Ill., assignors to Scully-Jones and Company, Chicago, Ill., a corporation of Illinois Application November 8, 1956, Serial No. 621,178

3 Claims. (Cl. 279—83)

In many modern machine tools and particularly those of the multiple spindle type, are ones in which the tools are to be pre-set in their holders, and it is particularly desirable to provide means whereby the holder with the tool therein may be quickly removed from the machine by withdrawing it backwards. Frequently in multiple spindle machines as, for instance, those driving a large number of drills or the like, it is difficult to withdraw the tool frontward from its supporting block.

One of the objects of the present invention is to provide means whereby the tool with its collet or tool adapter may be inserted or removed backwards from the block or support where there is sufficient room to readily withdraw it with the tool in place.

Other objects and advantages will appear more fully from the following description taken in connection with the accompanying drawings in which, Fig. 1 is a longitudinal sectional view of a tool carrying portion of a machine tool including the necessary parts for supporting and removing the tools;

Fig. 2 is an end view taken from the right hand end of Fig. 1 or the back end;

Fig. 3 is a cross sectional view taken on the line 3—3 of Fig. 1;

Fig. 4 is a detail of the locking plate; and

Fig. 5 is a detail of the locking lugs which coact with said plate.

In these drawings, 10 indicates a block or tool supporting part of a machine tool which may be fastened to a machine by means of bolts 11 and nuts 12 or in any other suitable manner. A chuck body or cylinder 13 is fixed in a hole 14 in the block. The chuck body carries a threaded collet 15 which is engaged by a threaded collar or nut 16 by means of which the collet may be adjusted longitudinally in the body. The collet is provided with a hole 16' for receiving the tool such as a drill 17 which may be held in any suitable manner as by means of set screws 18. The collet also has a longitudinal hole 19 for convenience in driving out any tool which may be stuck therein.

The chuck body and the collet have interengaging means for preventing relative rotation therebetween, such means comprising a Woodruff key 20 mounted in the collet which slides in the keyway 21 in the chuck body. A threaded hole 22 in the block serves for introducing a coolant into the space 23a in the chuck body.

The chuck body 13 has a threaded extension 23 at the end opposite from the tool receiving opening and is provided adjacent to this end with radially extending locking lugs 24 which engage with or fit against the end 25 of the block as shown in Fig. 1.

A locking plate 26 is firmly secured to the end of the block by means of bolts or screws 27. This plate has a central opening 28 which is sufficiently large to permit the collet 15 and tool to pass therethrough. The plate has two segmental depressions or recesses 29 and oppositely disposed radial slots or openings 30 for receiving the fastening lugs 24, the arrangement is such that the lugs will pass through the slots or openings 30 into locking position as shown in Fig. 1 and then the chuck body may be turned to cause the lugs to pass into the depressions or recesses as shown in Fig. 3. The extension 23 is provided with a hole 31 through which a pin or rod may be extended for turning the chuck body to locking position.

The threaded extension 23 has a nut 32 which is provided with a pin 33 for tightening the same. This nut presses against the plate 26 and causes the locking lugs to be fastened securely in adjusted positions. The threads on the extension 23 are preferably left-handed so that the fastening will not be loosened by the action of the tool.

From this description, it will be seen that we provide means whereby the tool may be quickly removed from the machine tool as, for instance, when the tool becomes dulled or broken and the tool may then be pre-set to accurate position, the gage dimension being indicated on Fig. 1. Furthermore, the ability to withdraw the tool from the block or holder from rear or back is of great advantage in the quick changing or setting up of the machine or tools. This may be done ordinarily without the use of any tools.

What we claim is:

1. In a quick-change tool holder, the combination of a tool holding block, a chuck body mounted in the block for longitudinal movement, an adapter adjustably mounted in the body for longitudinal movement, and means whereby the body may be inserted and removed from the end of the block opposite the one from which the cutting tool extends and means for holding the chuck body in adjusted position.

2. A quick-change tool holder including a tool carrying block having a longitudinal opening therein, a cylindrical chuck body mounted in the opening, an adapter or tool carrying member mounted in the chuck body, said chuck body having radial lugs at one end adapted to engage with the end of the block, a locking plate secured to the block and provided with locking means coacting with said lugs, the chuck body being threaded adjacent to the locking means and a nut for engagement with said threads which coacts with the locking plate for holding the chuck body securely in adjusted position.

3. In combination, a block to be carried by a machine tool and having a longitudinal opening therethrough, a chuck body engaging with said opening, a collet mounted in the chuck body, interengaging means between the collet and chuck body to prevent relative rotation therebetween but permitting longitudinal movement of the collet, a nut on the collet for adjusting the same in the chuck body, said collect being provided with means for holding the tool, the chuck body having a threaded extension at one end and having locking lugs on the extension which fit against the end of the block, a locking plate secured to the block and having a passageway for the chuck body, said locking plate having oppositely disposed openings to permit the passage of the lugs and having recesses adjacent to the openings for receiving the lugs in locking position, and a nut on the threaded extension engaging with the plate.

References Cited in the file of this patent

UNITED STATES PATENTS

| 1,194,793 | Styers | Aug. 15, 1916 |
| 2,709,600 | Lehde | May 31, 1955 |